United States Patent

Morimoto et al.

(10) Patent No.: US 9,322,579 B2
(45) Date of Patent: Apr. 26, 2016

(54) THERMO-MAGNETIC CYCLE APPARATUS

(71) Applicant: DENSO CORPORATION, Kariya, Aichi-pref. (JP)

(72) Inventors: Tsuyoshi Morimoto, Obu (JP); Naoki Watanabe, Nagoya (JP); Shigeo Nomura, Toyohashi (JP); Takuya Fuse, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 217 days.

(21) Appl. No.: 14/248,648

(22) Filed: Apr. 9, 2014

(65) Prior Publication Data

US 2014/0305138 A1  Oct. 16, 2014

(30) Foreign Application Priority Data

Apr. 12, 2013  (JP) .................................. 2013-084351

(51) Int. Cl.
*F25B 21/02* (2006.01)
*F25B 21/00* (2006.01)

(52) U.S. Cl.
CPC .......... *F25B 21/00* (2013.01); *F25B 2321/0022* (2013.01); *Y02B 30/66* (2013.01)

(58) Field of Classification Search
CPC .......... F25B 21/00; F25B 21/02; Y02B 30/66; H01L 35/30
USPC ................................................. 62/3.1, 3.3, 6
See application file for complete search history.

(56) References Cited

U.S. PATENT DOCUMENTS

| | | | | |
|---|---|---|---|---|
| 4,509,334 A | * | 4/1985 | Nakagome ............... | F25B 21/00 165/104.21 |
| 4,599,866 A | * | 7/1986 | Nakagome ............... | F25B 21/00 505/889 |
| 4,829,770 A | * | 5/1989 | Hashimoto ............... | C09K 5/16 62/3.1 |
| 2005/0120720 A1 | * | 6/2005 | Fang ........................ | F25B 21/00 62/3.1 |
| 2007/0125094 A1 | | 6/2007 | Iwasaki et al. | |
| 2011/0067416 A1 | * | 3/2011 | Chang ........................ | F24J 3/00 62/3.1 |
| 2012/0285179 A1 | | 11/2012 | Morimoto et al. | |
| 2012/0291453 A1 | | 11/2012 | Watanabe et al. | |
| 2013/0298571 A1 | | 11/2013 | Morimoto et al. | |

FOREIGN PATENT DOCUMENTS

| | | |
|---|---|---|
| JP | 2007-147209 | 6/2007 |
| JP | 2012-255642 | 12/2012 |

OTHER PUBLICATIONS

Office Action dated Mar. 10, 2015 in corresponding Japanese Application No. 2013-084351.

* cited by examiner

*Primary Examiner* — Melvin Jones
(74) *Attorney, Agent, or Firm* — Harness, Dickey & Pierce, P.L.C.

(57) ABSTRACT

A magneto-caloric effect type heat pump apparatus provides a thermo-magnetic cycle apparatus. A magnetic field modulating device has a rotary permanent magnet. By rotating the permanent magnet, magnetic field applied to a magneto-caloric element is modulated alternatively in a magnetized state and a demagnetized state. A magnetized period, when the magnetic field is applied, is shorter than a demagnetized period, when the magnetic field is removed. Thereby, it is possible to reduce weight of the magnetic field modulating device having the permanent magnet. The magneto-caloric element has a heat exchange portion which varies heat exchanging efficiency depending on flow directions of a heat transport medium. The heat exchanging efficiency in the magnetized period is higher than the heat exchanging efficiency in the demagnetized period. Therefore, it is possible to provide sufficient heat exchanging quantity even in a short magnetized period.

12 Claims, 5 Drawing Sheets

THERMO-MAGNETIC CYCLE APPARATUS

CROSS REFERENCE TO RELATED APPLICATION

This application is based on Japanese Patent Application No. 2013-84351 filed on Apr. 12, 2013, the disclosure of which is incorporated herein by reference in its entirety.

TECHNICAL FIELD

The present disclosure relates to a thermo-magnetic cycle apparatus using magneto-caloric effect of magnetic material. The thermo-magnetic cycle apparatus may be used as a magneto-caloric effect type heat pump apparatus.

BACKGROUND

JP2012-255642A and JP4557874B disclose a magneto-caloric effect type heat pump apparatus which is one embodiment of the thermo-magnetic cycle apparatus which uses a temperature characteristic of a magnetic substance. The documents propose heat pump apparatuses using the magneto-caloric effect of the magneto-caloric element which is a magnetic substance. The proposed apparatuses have a magnetic field modulating device having a permanent magnet and yoke members forming a magnetic path. The magnetic field modulating device cyclically and alternately switches a state of external magnetic field. The magnetic field modulating device switches between a state where the external magnetic field is applied to the magneto-caloric element and a state where the external magnetic field is removed from the magneto-caloric element. The state where the external magnetic field is applied may also be referred to as a magnetized state. The state where the external magnetic field is removed may also be referred to as a demagnetized state. The magnetic field modulating device modulates periodically strength of the external magnetic field which is applied to the magneto-caloric element by rotating magnetic members including the permanent magnet.

SUMMARY

The magnetic circuits disclosed in the documents are large and heavy. For this reason, the thermo-magnetic cycle apparatus had large body and heavy weight. It such view points, it is demanded to improve the thermo-magnetic cycle apparatus.

It is an object of the present disclosure to provide a lightweight thermo-magnetic cycle apparatus.

It is another object of the present disclosure to provide a small thermo-magnetic cycle apparatus.

It is still another object of the present disclosure to provide a thermo-magnetic cycle apparatus which can use a magnetic field modulating device that provides a magnetizing period shorter than a demagnetizing period.

The present disclosure employs the following technical means, in order to attain the above-mentioned object.

According to a disclosure, a thermo-magnetic cycle apparatus is provided. The apparatus comprised a magneto-caloric element which generates heat dissipation and heat absorption in response to strength change of an external magnetic field. The apparatus also comprises a magnetic field modulating device which modulates the external magnetic field applied to the magneto-caloric element. The device modulates the external magnetic field so that a magnetized period and a demagnetized period are periodically altered. The magnetized period is when the magneto-caloric element is placed in a strong external magnetic field. The demagnetized period is when the magneto-caloric element is placed in a weak external magnetic field which is weaker than that in the magnetized period. The device modulates the external magnetic field so that the magnetized period is shorter than the demagnetized period.

According to the above arrangement, since the magnetized period is shorter than the demagnetized period, it is possible to reduce weight of a magnetism source for supplying the external magnetic field.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are explained referring to drawings. In the embodiments, the same parts and components as those in each embodiment are indicated with the same reference numbers and the same descriptions will not be reiterated. In a case that only a part of component or part is described, other descriptions for the remaining part of component or part in the other description may be incorporated. Components and parts corresponding to the components and parts described in the preceding description may be indicated by the same reference number and may not be described redundantly. The embodiments may be partially combined or partially exchanged in some forms which are clearly specified in the following description. In addition, it should be understood that, unless trouble arises, the embodiments may be partially combined or partially exchanged each other in some forms which are not clearly specified.

First Embodiment

Figure 1:
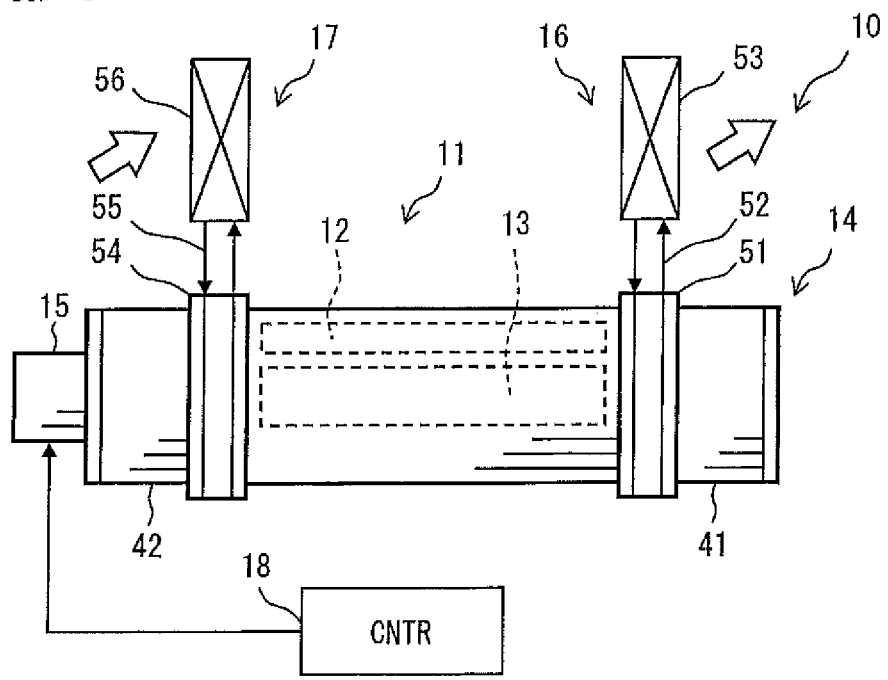
FIG. 1 is a block diagram of a magneto-caloric effect type heat pump apparatus (henceforth a MHP apparatus) according to a first embodiment.

FIG. 1 is a block diagram showing a vehicle air-conditioner 10 for vehicle according to a first embodiment that practices the invention. The vehicle air-conditioner 10 has a magneto-caloric effect type heat pump apparatus 11. Hereinafter, the magneto-caloric effect type heat pump apparatus 11 may be referred as MHP apparatus 11. The MHP apparatus 11 provides the thermo-magnetic cycle apparatus.

In this specification, the word of the heat pump apparatus is used in a broad sense. That is, the word of the heat pump apparatus includes both of a heat pump apparatus using cold energy and a heat pump apparatus using hot energy. The heat pump apparatus using cold energy may correspond to a refrigerating cycle apparatus. The word of the heat pump apparatus may be used as a concept that includes the refrigerating cycle apparatus.

The MHP apparatus 11 has a magneto-caloric effect element. Hereinafter, the magneto-caloric effect element may be referred to as MCE element. The MCE element 12 produces both heat generation and heat absorption in response to strength of an external magnetic field. The MCE element 12 generates heat in response to applying the external magnetic field, and absorbs heat in response to removing the external magnetic field. When the external magnetic field is applied to the MCE element 12, electron spins gather in the direction of the magnetic field. At this time, magnetic entropy decreases and the temperature is raised by emitting heat. When the external magnetic field is removed from the MCE element 12, the electron spins become to have disordered state. At this time, magnetic entropy increases and the temperature is lowered by absorbing heat. The MCE element 12 is made of magnetic substance which has a high magneto-caloric effect in an ordinary temperature region. For example, the MCE element 12 may be made of a gadolinium(Gd)-base material or lanthanum-iron-silicon compound. Alternatively, a mixture of manganese, iron, phosphorus, and germanium may be used.

One MCE element 12 and components relevant to it provide a magneto-caloric element unit. The magneto-caloric element unit may be referred to as an MCD unit (Magneto-Caloric effect Device unit.) The MHP apparatus 11 uses magneto-caloric effect of the MCE element 12. The MHP apparatus 11 has a magnetic field modulating (MFM) device 13 and a heat transporting device 14 for operating the MCE element 12 as an AMR (Active Magnetic Refrigeration) cycle.

The MFM device 13 applies the external magnetic field to the MCE element 12, and varies the strength of the external magnetic field applied to the MCE element 12. The MFM device 13 periodically switches the magnetized state where the MCE element 12 is placed in a strong magnetic field and the demagnetized state where the MCE element 12 is placed in a weak magnetic field or a zero magnetic field. The MFM device 13 modulates the external magnetic field so that the external magnetic field periodically repeats a magnetized period PM when the MCE element 12 is placed in a strong magnetic field and a demagnetized period PN when the MCE element 12 is placed in the external magnetic field that is weaker than that in the magnetized period PM. The MFM device 13 is set to provide the magnetized period PM that is shorter (PM<PN) than the demagnetized period PN. The MFM device 13 has a magnetism source for generating the external magnetic field, for example, a permanent magnet, and an electromagnet. The magnetism source is configured to set the magnetized period PM is shorter than the demagnetized period PN.

The heat transporting device 14 has fluid devices for generating flow of a heat transport medium for transporting heat to be dissipated or absorbed by the MCE element 12. The heat transporting device 14 is a device which generates flow of the heat transport medium so that the heat transport medium flows along the MCE element 12 and performs heat exchange with the MCE element 12. The heat transporting device 14 generates a bidirectional flow including a flow FM and a flow FN of the heat transport medium. The flow of the heat transport medium is the bidirectional flow FM, FN switched alternately in a synchronizing manner with change of the external magnetic field by the MFM device 13.

In this embodiment, the heat transport medium which carries out heat exchange to the MCE element 12 is called a primary medium. The primary medium can be provided by fluid, such as anti-freezing solution, water, and oil. The heat transporting device 14 generates a bidirectional flow of the heat transport medium. The heat transporting device 14 alternately changes flow directions of the heat transport medium in a forward and backward manner in a synchronizing manner with an increasing and decreasing changes of the external magnetic field by the MFM device 13. The heat transporting device 14 may have a pump for generating flow of the heat transport medium. The heat transporting device 14 has pumps 41 and 42 for generating flow of the primary medium. The pumps 41 and 42 supply the bidirectional flow of the primary medium for one MCE element 12. The pumps 41 and 42 are arranged on both ends of the MCE element 12. The pumps 41 and 42 are arranged to perform complementarily a suction process and a discharge process.

The MHP apparatus 11 has a motor 15 as a source of power. The motor 15 is the source of power for the MFM device 13. The motor 15 is the source of power for the heat transporting device 14.

The MHP apparatus 11 has a high-temperature system 16 which conveys high temperature created by the MHP apparatus 11. The high-temperature system 16 is also a device which uses the high temperature created by the MHP apparatus 11. The MHP apparatus 11 has a low-temperature system 17 which conveys low temperature created by the MHP apparatus 11. The low-temperature system 17 is also a device which uses the low temperature created by the MHP apparatus 11.

The high-temperature system 16 has a heat exchanger 51 which provides heat exchange between the primary medium and a secondary medium for the high-temperature system 16. The secondary medium is a heat transport medium used to convey thermal energy in the high-temperature system 16. The secondary medium can be provided by fluid, such as anti-freezing solution, water, and oil. The high-temperature system 16 has a passage 52 in which the secondary medium flows in a circulating manner. The high-temperature system 16 has a heat exchanger 53 which provides heat exchange between the secondary medium and the other medium. For example, the heat exchanger 53 provides heat exchange between the secondary medium and air. The high-temperature system 16 is also a device which removes heat, i.e., thermal energy, from the high-temperature end, and cools the high-temperature end.

The low-temperature system 17 has a heat exchanger 54 which provides heat exchange between the primary medium and a secondary medium for the low-temperature system 17. The secondary medium is a heat transport medium used to convey thermal energy in the low-temperature system 17. The secondary medium can be provided by fluid, such as anti-freezing solution, water, and oil. The low-temperature system 17 has a passage 55 in which the secondary medium flows in a circulating manner. The low-temperature system 17 has a heat exchanger 56 which provides heat exchange between the secondary medium and the other medium. For example, the heat exchanger 56 provides heat exchange between the secondary medium and air. The low-temperature system 17 is also a device which brings heat, i.e., thermal energy, into the low-temperature end, and heats the low-temperature end.

The vehicle air-conditioner 10 is mounted on a vehicle, and carries out temperature control of passenger compartment of the vehicle. Two heat exchangers 53 and 56 provide components of the vehicle air-conditioner 10. The heat exchanger 53 is a high-temperature-side heat exchanger 53 of which temperature usually reach higher than that of the heat exchanger 56. The heat exchanger 53 may also be called an indoor heat exchanger 53. The heat exchanger 56 is a low-temperature-side heat exchanger 56 of which temperature usually reaches lower than that of the heat exchanger 53. The heat exchanger 56 may also be called an outdoor heat exchanger 56. The vehicle air-conditioner 10 also has air-system devices such as an air-conditioning duct and fan which are provided to use the high-temperature-side heat exchanger 53 and/or the low-temperature-side heat exchanger 56 for air conditioning.

The vehicle air-conditioner 10 may be used as an air cooling device or an air heating device. The vehicle air-conditioner 10 may have a cooler for cooling air supplied to the compartment and a heater for heating again the air cooled by the cooler. The MHP apparatus 11 may be used as a cold-energy supplying source in the vehicle air-conditioner 10 or a warm-energy supplying source in the vehicle air-conditioner 10. That is, the high-temperature-side heat exchanger 53 may be used as the heater. The low-temperature-side heat exchanger 56 may be used as the cooler.

When the MHP apparatus 11 is used as the warm-energy supplying source, air passing through the high-temperature-side heat exchanger 53 is supplied to the compartment and is used for heating. At this time, the air which passed the low-temperature-side heat exchanger 56 is discharged to the outside of the vehicle. When the MHP apparatus 11 is used as a cold-energy supplying source, air passing through the low-temperature-side heat exchanger 56 is supplied to the compartment and is used for cooling. At this time, the air which passed the high-temperature-side heat exchanger 53 is discharged to the outside of the vehicle. The MHP apparatus 11 may be used as a dehumidifier system. In this case, air passes through the low-temperature-side heat exchanger 56, and then, passes the high-temperature-side heat exchanger 53, and is supplied to the compartment. The MHP apparatus 11 may be used as a warm-energy supplying source both in the summer season and the winter season.

The vehicle air-conditioner 1 has a controller (CNTR) 18. The controller 18 controls a plurality of controllable components of the vehicle air-conditioner 10. For example, the controller 18 controls the motor 15 to at least switch the MHP apparatus 11 in an activated mode and a deactivated mode.

The controller 18 is an electronic control unit. The controller 18 is an electrical control unit (ECU). The controller 18 has at least one processing unit (CPU) and at least one memory device (MMR) provided as a storage medium which stores a set of program and data. The controller 18 is provided with a microcomputer having the storage medium readable by a computer. The storage medium is a non-transitory storage medium which stores a program readable by the computer. The storage medium can be provided by a device, such as a solid state memory device and a magnetic disc memory. The controller 18 is provided with one computer, or a set of computer resources linked by a data communication device. The program, when executed by the controller 18, makes the controller 18 to function as devices described in this specification, and makes the controller 18 to perform methods described in this specification. The controller 18 provides a plurality of various elements. At least a part of those elements may be called as means for performing functions, and, in another aspect, at least a part of those elements may be called as structural blocks or modules.

Figure 2:
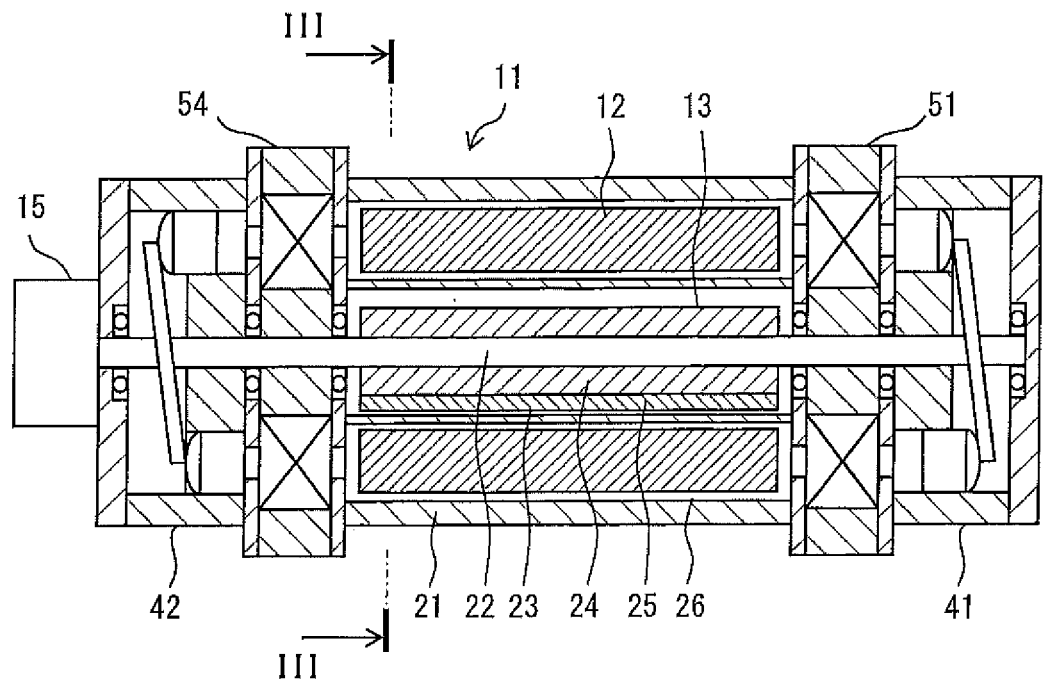
FIG. 2 is a cross-sectional view of the MHP apparatus according to the first embodiment.
Figure 3:
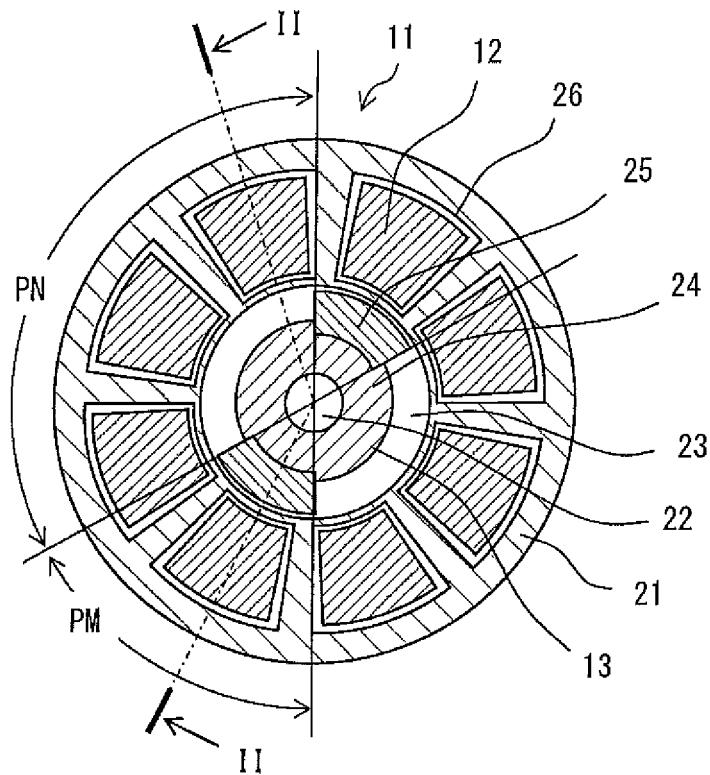
FIG. 3 is a cross-sectional view of the MHP apparatus according to the first embodiment.

FIG. 2 is a cross-sectional view of the MHP apparatus 11 according to the first embodiment. FIG. 3 is a cross-sectional view of the MHP apparatus 11 according to the first embodiment. FIG. 2 shows a cross-section on a line shown in FIG. 3. FIG. 3 shows a cross-section on a line shown in FIG. 2.

The motor 15 provided as the power source for the MHP apparatus 11 is driven by a battery mounted on the vehicle. The motor 15 rotates the rotor 13 which provides the MFM device 13. Thereby, the motor 15 and the MFM device 13 creates a periodically alternating change between an applied state in which the external magnetic field is applied to the MCE element 12 and an removed state in which the external magnetic field is removed from the MCE element 12. The removed state may be referred to as a non-applied state in which the external magnetic field is not applied to the MCE element 12. The motor 15 drives the pumps 41 and 42 of the heat transporting device 14. Thereby, the pumps 41 and 42 generate the bidirectional flow of the primary medium for one MCE element 12.

The pumps 41 and 42 produce the bidirectional flow of the primary medium in the MCD unit in order to make the MCE element 12 functions as the AMR cycle. The pumps 41 and 42 are displacement-type bidirectional flow pumps. The pumps 41 and 42 are cam-plate type piston pumps. The pumps 41 and 42 are axial piston pumps having a plurality of cylinders. One cylinder of the pump 41 and one cylinder of the pump 42 are arranged to one MCE element 12. Two cylinders arranged on one MCE element 12 functions complementarily. Thereby, the pumps 41 and 42 supply the bidirectional flow of the primary medium flowing along the longitudinal direction of one MCE element 12. In this embodiment, the MHP apparatus 11 has a plurality of MCE elements 12 which are connected in thermally parallel. In the MHP apparatus 11, eight MCE elements 12 are connected in thermally parallel. Therefore, each one of the pumps 41 and 42 has 8 cylinders.

The MHP apparatus 11 has a housing 21 which may be called as a circular cylindrical or a circular columnar shape. The housing 21 supports the rotary shaft 22 rotatably on a central axis of the housing 21. The rotary shaft 22 is connected with the output shaft of the motor 15. The housing 21 defines an accommodation chamber 23 for accommodating the MFM device 13 around the rotary shaft 22. The accommodation chamber 23 is formed in a shape like a circular columnar shape. A rotor core 24 is fixed to the rotary shaft 22. The rotor core 24 and the housing 21 provide yoke members for guiding and passing the magnetic flux. The rotor core 24 is configured to form a range which is easy to pass through the magnetic flux along the circumferential direction thereof and a range which is hard to pass through the magnetic flux. A permanent magnet 25 is fixed to the rotor core 24. A plurality of magnets 25 are fixed on the rotor core 24. The permanent magnet 25 is formed in a semi-cylindrical shape which has a fan-shaped cross section. The permanent magnet 25 is fixed on a radial outside surface of the rotary shaft 22.

The rotor core 24 and the permanent magnet 25 form regions around them. One region is that the external magnetic field provided by the permanent magnet 25 is strong. The other one region is that the external magnetic field provided by the permanent magnet 25 is weak. In the region in which the external magnetic field is weak, a state in which the external magnetic field is almost completely removed is provided. The rotor core 24 and the permanent magnet 25 rotate in a synchronizing manner with a revolution of the rotary shaft 22. Therefore, the region of strong external magnetic field and the region of weak external magnetic field rotate synchronously with the revolution of the rotary shaft 22. As a result, at one point on a circumference of the rotor core 24 and the permanent magnet 25, a period when the external magnetic field is strongly applied and a period when the external magnetic field becomes weak and was almost removed are alternately appears. Therefore, the rotor core 24 and the permanent magnet 25 provide the MFM device 13 which alternates the applied state and the removed state of the external magnetic field. The rotor core 24 and the permanent magnet 25 provide a device which alternately switches the state applying the external magnetic field to the MCE element 12 and the state removing the external magnetic field from the MCE element 12. The word of the magnetic field is interchangeable with magnetic flux density or magnetic field strength.

The housing 21 defines at least one work chamber 26. The work chamber 26 is located next to the accommodation chamber 23. The housing 21 defines a plurality of work chambers 26 arranged at equal intervals on a radial outside of the accommodation chamber 23. In this embodiment, one housing 21 defines eight work chambers 26. Each of the work chambers 26 forms a columnar-shaped chamber which has a longitudinal direction along the axial direction of the housing 21. One work chamber 26 is formed so that it corresponds to one cylinder of the pump 41 and one cylinder of the pump 42. Two cylinders are arranged on both sides of one work chamber 26.

The work chamber 26 provides a channel where the primary medium flows. The primary medium flows along a longitudinal direction of the work chamber 26. The primary medium flows along a longitudinal direction of the work chamber 26 in a bidirectional manner in which flow directions are alternately switched in one direction and the other opposite direction.

The work chamber 26 also provides an accommodation chamber in which the MCE element 12 is accommodated. The housing 21 provides a container in which the work chamber 26 is formed. The MCE element 12 which provides a magnetic working material having magneto-caloric effect is disposed in the work chamber 26.

One MCE element 12 is formed in a columnar shape, i.e., a rod shape, having a longitudinal direction along an axial direction of the MHP apparatus 11. The MCE element 12 is formed in a shape which can provides sufficient heat exchange with the primary medium flowing through within the work chamber 26. Each NICE element 12 may also be called an element bed.

The MCE element 12 is placed under an effect of the external magnetic field switched between an applied state and a removed state by the MFM device 13. That is, as the rotary shaft 22 rotates, it is performed to switch the applied state in which the external magnetic field for magnetizing the MCE element 12 is applied and the removed state in which the external magnetic field is removed from the MCE element 12.

As shown in FIG. 3, an angular range PM where the permanent magnet 25 is disposed along circumferential direction is shorter than an angular range PN where the permanent magnet 25 is not disposed. The permanent magnet 25 is fixed on a radial outside of the rotary shaft 22. An occupying rate of the permanent magnet 25 along a circumferential direction on a plan perpendicular to the rotary shaft 22 is smaller than ½ of the periphery.

The angular range PM may be referred to as an applying period in which the external magnetic field is applied to one MCE element 12, i.e., a magnetized period PM. The MFM device 13 has the permanent magnet 25 that has a size corresponding to the magnetized period PM. The angular range PN may also be referred to as a removal period in which the external magnetic field is removed from one MCE element 12, i.e., a demagnetized period PN. Demagnetization does not mean condition where magnetic field is zero. Demagnetization includes condition where magnetic field, which is weaker than magnetic field in the magnetized period PM, is still applied. By setting the magnetized period PM shorter than the demagnetized period PN (PM<PN), the angular range PM in which the permanent magnet 25 is disposed can be reduced. Thereby, it is possible to down size the permanent magnet 25 and the rotor core 13. It is possible to reduce weight of the permanent magnet 25 and the rotor core 13. In other words, it is possible to reduce weight of the magnetism source for applying the external magnetic field to the MCE element 12.

The angular range PM is shorter than ¾ of the angular range PN. Since the magnetized period PM is shorter than ¾ of the demagnetized period PN (PM<¾PN), it is possible to enlarge advantage of weight reduction and/or down sizing.

Corresponding to the magnetized period PM is set up shorter than the demagnetized period PN, a discharge and suction characteristic of the pumps 41 and 42 also set up asymmetrically. Since the MCE element 12 generates heat in the magnetized period PM, the pumps 41 and 42 are operated to make the primary medium flows toward the high-temperature system 16. On the other hand, since the MCE element 12 absorbs heat in the demagnetized period PN, the pumps 41 and 42 are operated to make the primary medium flows toward the low-temperature system 17. Since the magnetized period PM is shorter than the demagnetized period PN, a first period in which the primary medium flows toward the high-temperature system 16 is shorter than the second period in which the primary medium flows toward the low-temperature system 17. The magnetized period PM and the first period overlap in major range of them. The magnetized period PM and the first period may shift slightly at a starting range and an ending range of them. The demagnetized period PN and the second period overlap in major range of them. The demagnetized period PN and the second period may shift slightly at a starting range and an ending range of them. A flow amount of the primary medium flowing toward the high-temperature system 16 in the first period and a flow amount of the primary medium flowing toward the low-temperature system 17 in the second period are equal. The heat transporting device 14 provides the same flow amounts in each of flow directions of the bidirectional flow FM, FN. Although the first period is short, it is desirable to be performed sufficient heat exchange between the MCE element 12 and the primary medium in the first period.

Figure 4:
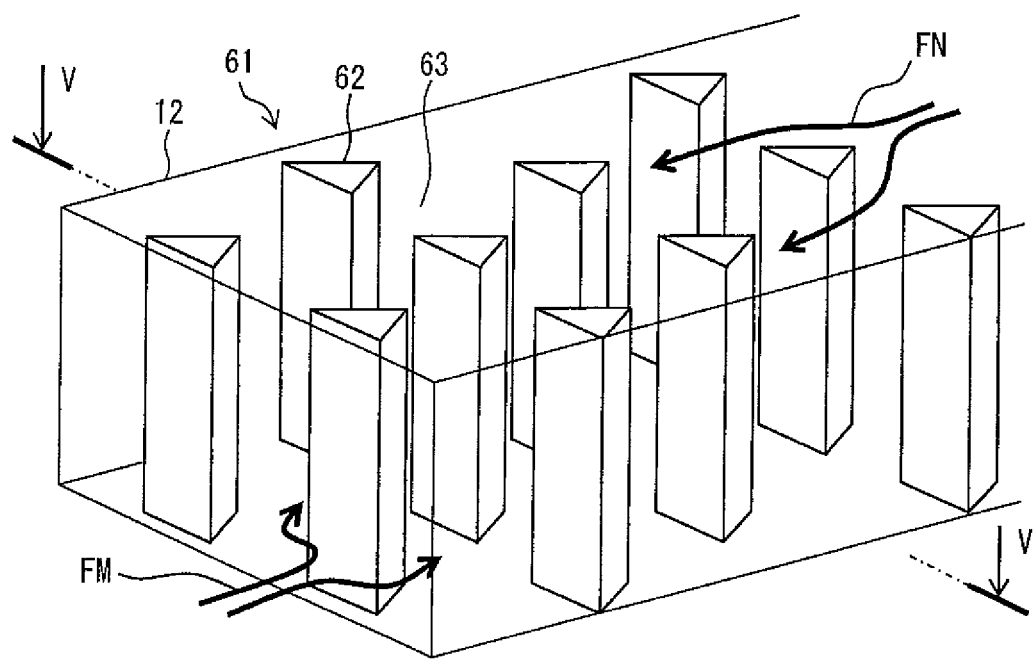
FIG. 4 is a perspective view of a magneto-caloric element according to the first embodiment.
Figure 5:
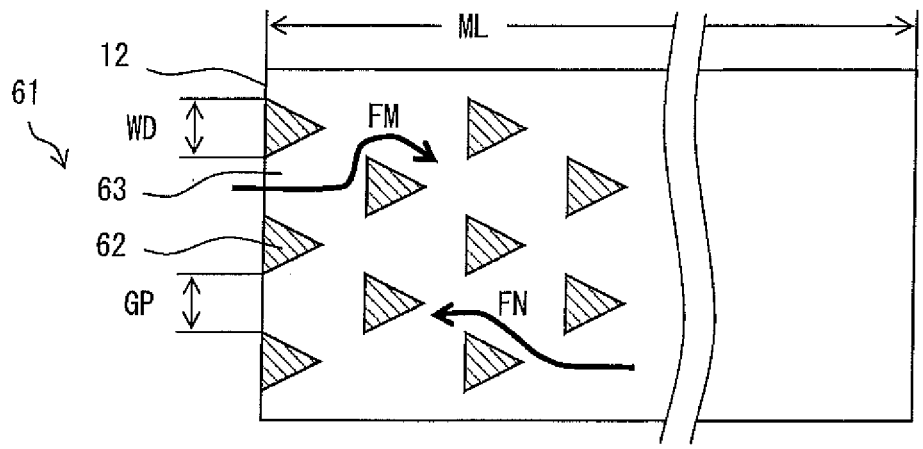
FIG. 5 is a cross-sectional view of a magneto-caloric element according to the first embodiment.

FIGS. 4 and 5 show a heat exchange portion 61 formed on the MCE element 12. FIG. 5 shows a cross section on a V-V line shown in FIG. 4. The MCE element 12 has a heat exchange portion 61 which performs heat exchange with the heat transport medium. The heat exchange portion 61 provides different heat exchanging efficiencies in one flow direction FM and in the other flow direction FN out of the bidirectional flow FM, FN. The heat exchange portion 61 has a configuration that presents asymmetrical different profiles against each of flow directions of the bidirectional flow FM, FN. The heat exchange portion 61 has a triangular pole-shaped projection 62. The MCE element 12 has a plurality of projections 62. The plurality of projections 62 defines a channel 63 for the primary medium around the projections 62. The projection 62 is positioned to direct one apex toward the high-temperature system 16. The projection 62 of the heat exchange portion 61 is arranged so that one side surface, i.e., a base surface, is directed toward the low-temperature system 17.

The flow FN which flows to the low-temperature system 17 in the demagnetized period PN collides with the apex of the projection 62. The flow FN flows smoothly along slant surfaces of the projection 62. On the other hand, the flow FM which flows toward the high-temperature system 16 in the magnetized period PM collides with the base surface of the projection 62. The flow FM is impeded by colliding onto the base surface of the projection 62. The flow FM produces turbulences around the projection 62.

The heat exchange portion 61 creates and provides higher pressure loss in the flow FM than that in the flow FN. The heat exchange portion 61 provides higher pressure loss of the heat transport medium in the magnetized period PM than that in the demagnetized period PN.

The heat exchange portion 61 provides higher heat exchanging efficiency in the flow FM than that in the flow FN. The heat exchange portion 61 provides higher heat exchanging efficiency in the flow FM of the primary medium in the magnetized period PM, i.e., in the flow FM toward the high-temperature system 16, than that in the flow FN in an opposite direction. The heat exchange portion 61 performs higher heat exchanging efficiency with the heat transport medium in the magnetized period PM than heat exchanging efficiency in the demagnetized period PN. The heat exchange portion 61 provides different heat exchanging efficiencies according to the flow directions of the heat transport medium. According to this arrangement, since it is possible to provide higher heat exchanging efficiency in the magnetized period PM than that in the demagnetized period PN, it is possible to obtain a large heat exchanging quantity even in the magnetized period PM that is short. Thereby, it is possible to obtain a necessary heat exchanging quantity between the MCE element 12 and the primary medium even in the first period that is short. Even if the apparatus uses the MFM device 13 that provides the magnetized period PM shorter than the demagnetized period PN, it is possible to obtain a required heat exchanging quantity in the bidirectional flow FM and FN of the heat transport medium.

In this embodiment, a flow amount in the flow FM and a flow amount in the flow FN, i.e., a moving amount of the primary medium in both directions are the same each other. A flow velocity of the flow FM and the flow velocity of the flow FN may be adjusted by changing a discharging characteristic and/or a drawing characteristic of the pumps 41 and 42.

Width WD of the projection 62 may be set within a range between 0.1 mm to 0.5 mm. Width GP of the channel 63 may be set within a range between 0.1 mm to 0.5 mm. Length ML of the MCE element 12 in the flow direction may be set within a range between 100 mm to 300 mm.

As the MHP apparatus 11 is activated and operated, applying the external magnetic field to the MCE element 12 and removing the external magnetic field from the MCE element 12 are alternately repeated periodically. Thereby, the MCE element 12 generates heat dissipation and heat absorption alternately. The pumps 41 and 42 generate the bidirectional flow of the primary medium in a synchronizing manner with the heat dissipation and the heat absorption on the MCE element 12. Thereby, heat is transferred around the MCE element 12.

By operating the MHP apparatus 11 in the above-mentioned way, the MCE element 12 disposed in the MHP apparatus 11 gets high temperature at the high temperature end and gets low temperature at the low temperature end. The MHP apparatus 11 supplies warm temperature to the high-temperature system 16 operatively disposed on and thermally connected with the high temperature end. The MHP apparatus 11 supplies cold energy to the low-temperature system 17 disposed on the low temperature end.

According to this embodiment, it is possible to provide a light-weight MHP apparatus 11 by setting the magnetized period PM shorter than the demagnetized period PN. According to this embodiment, it is possible to provide a small MHP apparatus 11 by setting the magnetized period PM shorter than the demagnetized period PN. The heat exchange portion which varies heat exchanging efficiency depending on flow directions of the primary medium is disposed between the magneto-caloric element 12 and the primary medium. Thereby, it is possible to obtain a necessary heat exchanging quantity between the MCE element 12 and the primary medium even in the configuration in which the magnetized period PM is shorter than the demagnetized period PN.

Second Embodiment

Figure 6:
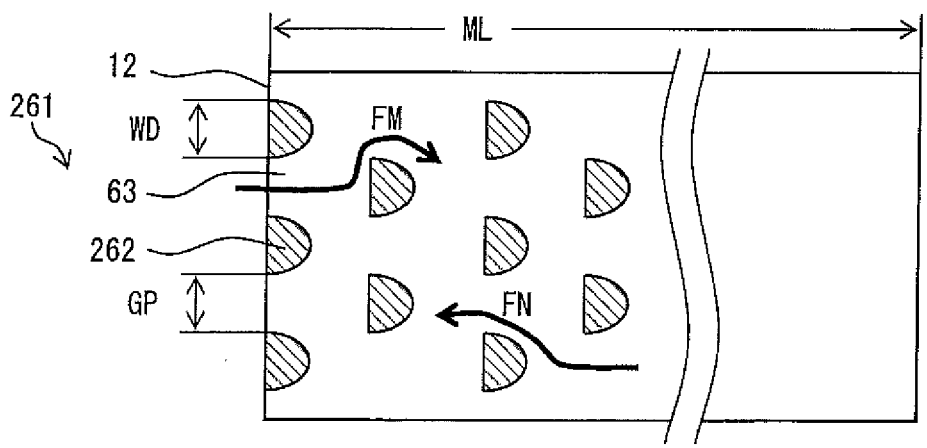
FIG. 6 is a cross-sectional view of a magneto-caloric element according to a second embodiment.

This embodiment is one of modifications based on a basic form provided by the preceding embodiment. The preceding embodiment employs the triangular pole-shaped projection 62. Alternatively, the heat exchange member may employ various configurations of which heat exchanging efficiency changes according to the flow direction of the primary medium. As shown in FIG. 6, this embodiment employs a heat exchange portion 261. The heat exchange portion 261 has projections 262 each of which is formed in a semi-circular columnar shape. The projections 262 provides higher heat exchanging efficiency in the flow FM than that in the flow FN. The heat exchange portion 261 has a configuration that presents asymmetrical different profiles against each of flow directions of the bidirectional flow FM, FN.

Third Embodiment

This embodiment is one of modifications based on a basic form provided by the preceding embodiment. In the preceding embodiments, the heat exchange portion 61 and 261 are provided by a static heat exchange portion. Alternatively, in this embodiment, the heat exchange portion 361 having a dynamic heat exchange member which can actively move in response to the flow of the primary medium is employed. The heat exchange portion 361 is capable of changing shapes in each of flow directions of the bidirectional flow FM, FN. The heat exchange portion 361 has a configuration that becomes and presents asymmetrical profiles on each of flow directions of the bidirectional flow FM, FN.

Figure 7:
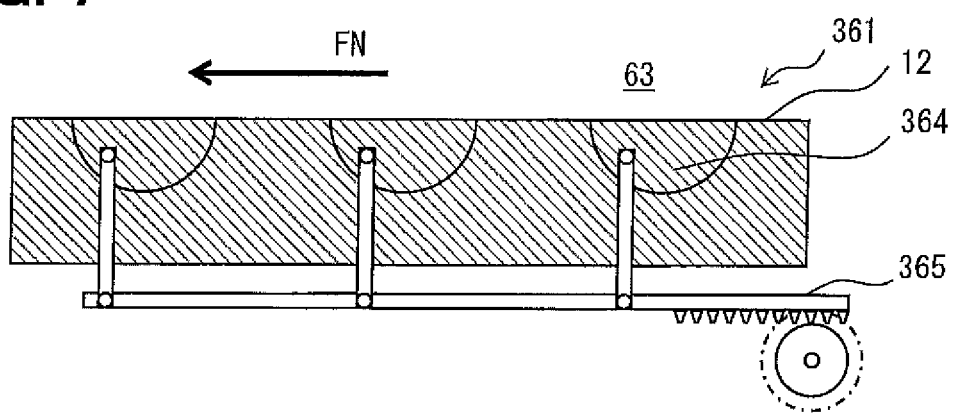
FIG. 7 is a cross-sectional view of a magneto-caloric element according to a third embodiment.
Figure 8:
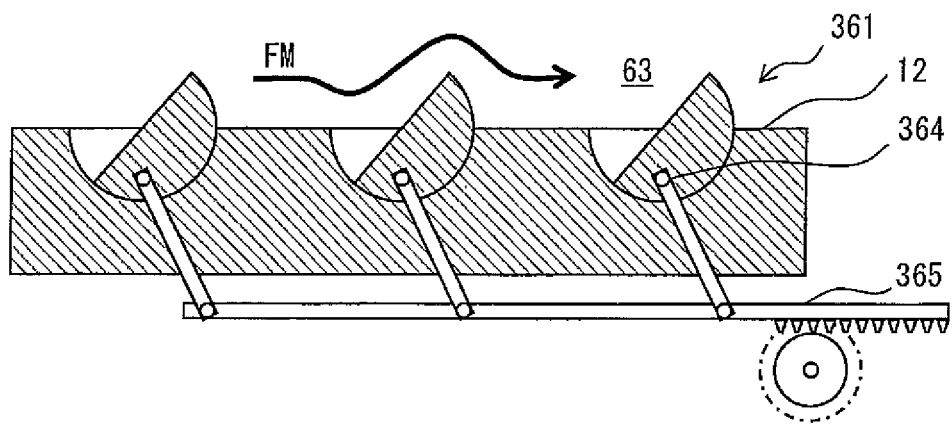
FIG. 8 is a cross-sectional view of a magneto-caloric element according to the third embodiment.

FIG. 7 shows condition of a heat exchange portion 361 in the demagnetized period PN. FIG. 8 shows condition of the heat exchange portion 361 in the magnetized period PM. As illustrated, the heat exchange portion 361 has a plurality of movable members 364, which are disposed on the MCE element 12, for performing heat exchange. The movable member 364 is formed in a shape like a semi-circular columnar shape. The movable member 364 is arranged on a boundary between the channel 63 and the MCE element 12. The movable member 364 is a part of the MCE element 12. The movable member 364 is rotatably supported, in a rocking manner, on a main part of the MCE element 12. The movable member 364 is movable to a first position and a second position by an actuating mechanism 365. The actuating mechanism 365 may be provided by actuators, such as a motor and electro-magnetic solenoid, and a mechanical linkage which links between the actuator and the movable member 364. The controller 18 may control the actuator so that the actuator moves the movable member 365 in a synchronized manner with a revolution of the motor 15.

In the first position shown in FIG. 7, the movable member 364 generates and obtains small pressure loss in the flow FN of the primary medium. In the first position, the movable member 364 provides low heat exchanging efficiency to the flow FN of the primary medium. In the first position, the movable member 364 provides small irregularities on the surface of the MCE element 12.

In the second position illustrated in FIG. 8, the movable member 364 generates and obtains large pressure loss to the flow FM of the primary medium. In the second position, the movable member 364 provides high heat exchanging efficiency to the flow FM of the primary medium. In the second position, the movable member 364 provides large irregularities on the surface of the MCE element 12. The irregularities in the second position are larger than the irregularities in the first position. According to this configuration, the heat exchange portion 361 demonstrates higher heat exchanging efficiency in the flow FM than that in the flow FN.

Fourth Embodiment

This embodiment is one of modifications based on a basic form provided by the preceding embodiment. The heat exchange portion 361 which is movable by an actuating mechanism is provided in the preceding embodiment. Alternatively, in this embodiment, the heat exchange portion 461 having a dynamic heat exchange member which can passively move in response to the flow of the primary medium is employed. The heat exchange portion 461 is capable of changing shapes in each of flow directions of the bidirectional flow FM, FN. The heat exchange portion 461 has a configuration that becomes and presents asymmetrical profiles against each of flow directions of the bidirectional flow FM, FN.

Figure 9:
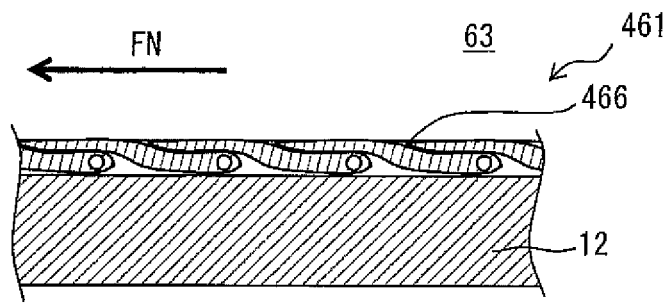
FIG. 9 is a cross-sectional view of a magneto-caloric element according to a fourth embodiment.
Figure 10:
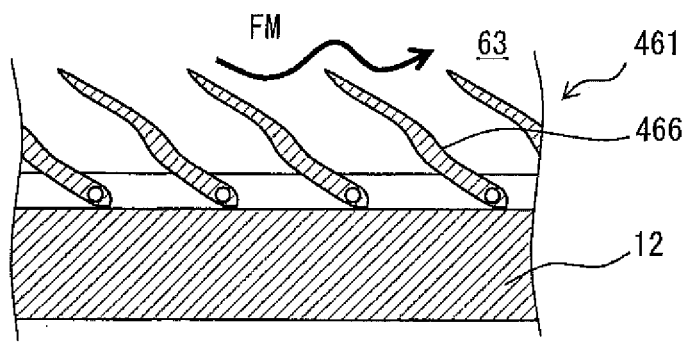
FIG. 10 is a cross-sectional view of a magneto-caloric element according to the fourth embodiment.

FIG. 9 shows condition of the heat exchange portion 461 in the demagnetized period PN. FIG. 10 shows condition of the heat exchange portion 461 in the magnetized period PM. As illustrated, the heat exchange portion 461 has a plurality of movable members 466, which are disposed on the MCE element 12, for performing heat exchange. The movable member 466 is formed in a shape like a fin. The movable member 466 is arranged on a boundary between the channel 63 and the MCE element 12. The movable member 466 is a part of the MCE element 12. The movable member 466 is rotatably supported, in a hinge-like manner, on a main part of the MCE element 12. The movable member 466 is movable to a first position and a second position by receiving the flow of the primary medium.

In the first position illustrated in FIG. 9, the movable member 466 obtains small pressure loss to the flow FN of the primary medium. In the first position, the movable member 466 provides low heat exchanging efficiency to the flow FN of the primary medium. In the first position, the movable member 466 provides small irregularities on the surface of the MCE element 12.

In the second position illustrated in FIG. 10, the movable member 466 obtains large pressure loss to the flow FN of the primary medium. In the second position, the movable member 466 provides high heat exchanging efficiency to the flow FN of the primary medium. In the second position, the movable member 466 provides large irregularities on the surface of the MCE element 12. According to this structure, the heat exchange portion 461 demonstrates higher heat exchanging efficiency in the flow FM than that in the flow FN.

Fifth Embodiment

This embodiment is one of modifications based on a basic form provided by the preceding embodiment. In the preceding embodiments, the MCE element 12 provides the heat exchange portion by an outside profile of itself. Alternatively, in this embodiment, the apparatus has a heat exchange portion 561 which varies heat exchanging efficiency depending on flow directions of the primary medium by vibrating the MCE element 12. The heat exchange portion 561 has a vibrator 567 which provides different vibrating state on the NICE element 12 in each of flow directions of the bidirectional flow FM, FN.

Figure 11:
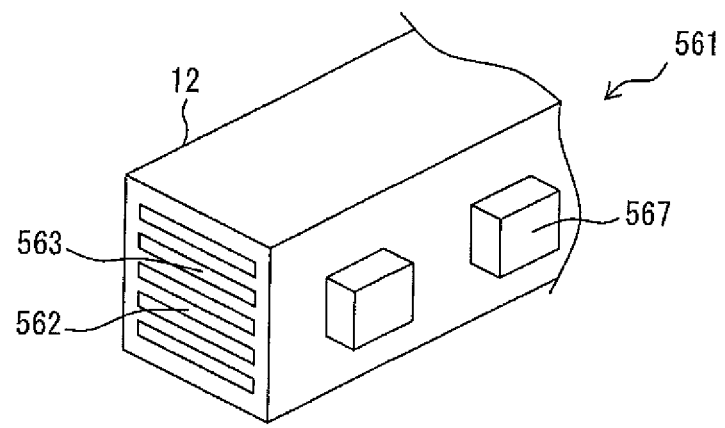
FIG. 11 is a perspective view of a magneto-caloric element according to a fifth embodiment.

FIG. 11 shows the perspective view of the MCE element 12. The NICE element 12 has a plurality of plate-shaped wall members 562 arranged in parallel each other. The wall members 562 define channels 563 for the primary medium on the wall members 562. The heat exchange portion 561 has a vibrator 567 which vibrates the MCE element 12. The vibrator 567 is an ultrasonic transducer. The vibrator 567 is disposed on a side surface of the MCE element 12 to vibrate the wall members 562. The vibrator 567 does not vibrate the MCE element 12 or vibrate small in the demagnetized period PN. The vibrator 567 vibrates the MCE element 12 greatly in the magnetized period PM. Thereby, the heat exchanging efficiency between the MCE element 12 and the primary medium is increased to be higher in the magnetized period PM than the demagnetized period PN. The controller 18 may control the vibrator 567 so that the vibrator 567 is activated and deactivated in a synchronized manner with a revolution of the motor 15. For example, the controller 18 deactivate the vibrator 567 to stop vibration when the primary medium flows in the direction shown by the symbol PM, and activate the vibrator 567 to supply vibration when the primary medium flows in the direction shown by the symbol PN. According to this configuration, the heat exchange portion 561 demonstrates higher heat exchanging efficiency in the flow FM than that in the flow FN.

Sixth Embodiment

This embodiment is one of modifications based on a basic form provided by the preceding embodiment. In the embodiments, pumps 41 and 42 are arranged on both ends of the MCE element 12. Alternatively, in this embodiment, two MCE elements 12a and 12b are used. A pump 643 is arranged between the MCE elements 12a and 12b.

Figure 12:
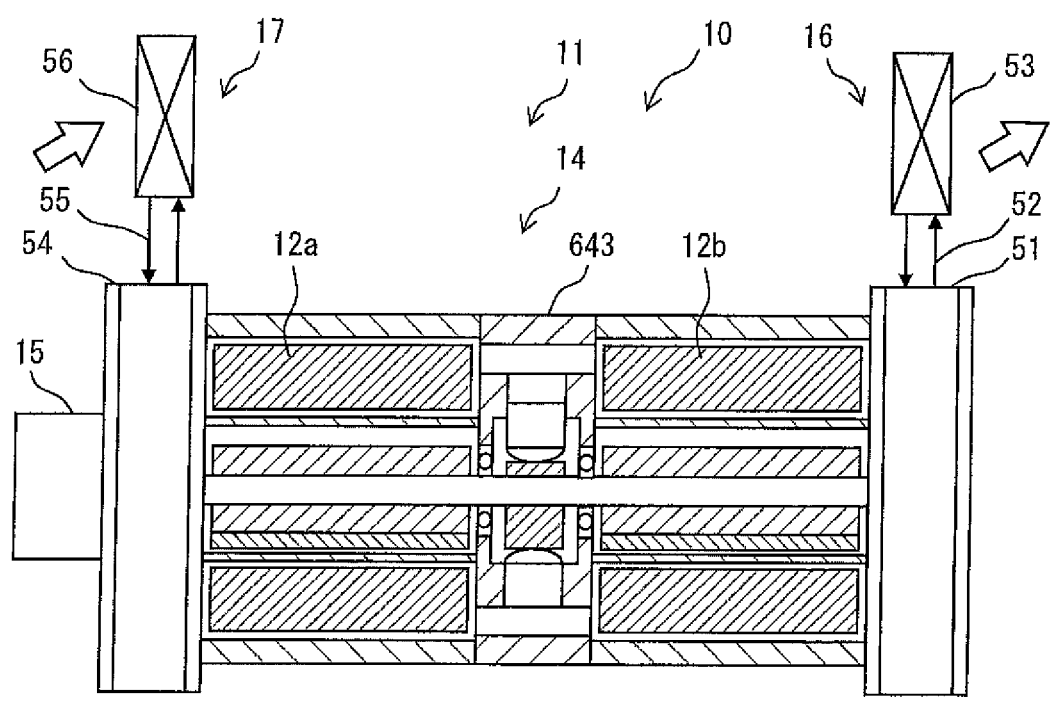
FIG. 12 is a cross-sectional view of the MHP apparatus according to a sixth embodiment.

As shown in FIG. 12, the MHP apparatus 11 has two MCE elements 12a and 12b. The heat transporting device 14 has the pump 643 arranged between two MCE elements 12a and 12b. The pump 643 generates flow of the primary medium to pass through both of the MCE elements 12a and 12b. The pump 643 may be provided by a radial piston pump. According to this embodiment, the primary medium can be supplied to two MCE elements 12a and 12b by using one pump 643.

Other Embodiments

The present disclosure is not limited to the above embodiments, and the present disclosure may be practiced in various modified embodiments. The configuration, function, and advantages of the above described embodiments are just examples. The technical scope of the present disclosure shall not be limited by the above descriptions. The present disclosure is not limited to the above combination, and disclosed technical means can be practiced independently or in various combinations. Some extent of the disclosure may be shown by the scope of claim, and also includes the changes, which is equal to and within the same range of the scope of claim.

In the embodiments, the multi-cylinder pump is provided by the swash plate type pump or the radial piston pump. Alternatively, the other type of displacement pump may be used. In the first embodiment, one work chamber is disposed to be associated with one cylinder of the pump. Alternatively, a plurality of cylinders and one work chamber may be disposed to be associated with, one cylinder and a plurality of work chambers may be disposed to be associated with, or a plurality of cylinders and a plurality of work chambers may be disposed to be associated with.

In the preceding embodiments, the present disclosure is applied to the air-conditioner for vehicle. Alternatively, the present disclosure may be applied to an air-conditioner for residences. Further alternatively, the present disclosure may be utilized to provide a hot-water-supply apparatus which heats water. In the embodiments, the MHP apparatus 11 uses the outside air as the main heat source. Alternatively, the other heat sources, such as water or soil, may be used as the main heat source.

In the preceding embodiments, the MHP apparatus 11 is shown as one example of the thermo-magnetic cycle apparatus. Alternatively, the present disclosure may be applied to a thermo-magnetic engine apparatus which is another one of the thermo-magnetic cycle apparatus. For example, a thermo-magnetic engine apparatus can be provided by adjusting the phase angle of the magnetic-field change and the heat transport medium flow on the MHP apparatus 11.

In the preceding embodiments, a pump that performs the suction process and the discharge process complementarily is employed to generate a bidirectional flow, i.e., a reversible flow or an alternating flow of the heat transport medium. The present disclosure is not limited to use such a pump. The present disclosure may be applied to an apparatus that generates the bidirectional flow by using a unidirectional flow pump and valves, for example.

In the preceding embodiments, the external magnetic field is modulated by relatively moving the permanent magnet to the magneto-caloric element. The present disclosure is not limited to use such a magnetic field modulating device. The present disclosure may be applied to an apparatus that modulates the external magnetic field by relatively moving the magneto-caloric element to the permanent magnet.

For example, means and functions of the control device 10 may be provided by only software, only hardware or a combination of the software and the hardware. For example, the control device may be made of an analogue circuit.

What is claimed is:

1. A thermo-magnetic cycle apparatus comprising:
    a magneto-caloric element which generates heat dissipation and heat absorption in response to strength change of an external magnetic field; and
    a magnetic field modulating device which modulates the external magnetic field so that a magnetized period, when the magneto-caloric element is placed in a strong external magnetic field, and a demagnetized period, when the magneto-caloric element is placed in a weak external magnetic field which is weaker than that in the magnetized period, are periodically altered, and so that the magnetized period is shorter than the demagnetized period.

2. The thermo-magnetic cycle apparatus in claim 1, further comprising:
    a heat transporting device which generates flow of the heat transport medium so that the heat transport medium flows along the magneto-caloric element and performs heat exchange with the magneto-caloric element, the flow of the heat transport medium being a bidirectional flow switched alternately synchronizing with change of the external magnetic field by the magnetic field modulating device, wherein
    the magneto-caloric element has a heat exchange portion which performs heat exchange with the heat transport medium.

3. The thermo-magnetic cycle apparatus in claim 2, wherein
    the heat exchange portion performs higher heat exchanging efficiency with the heat transport medium in the magnetized period than heat exchanging efficiency in the demagnetized period.

4. The thermo-magnetic cycle apparatus in claim 2, wherein
    the heat exchange portion performs different heat exchanging efficiencies according to the flow directions of the heat transport medium.

5. The thermo-magnetic cycle apparatus in claim 2, wherein
    the heat exchange portion provides higher pressure loss of the heat transport medium in the magnetized period than that in the demagnetized period.

6. The thermo-magnetic cycle apparatus in claim 2, wherein
    the heat exchange portion has a configuration that presents asymmetrical profiles against each of flow directions of the bidirectional flow.

7. The thermo-magnetic cycle apparatus in claim 6, wherein
    the heat exchange portion is capable of changing shapes in each of flow directions of the bidirectional flow.

8. The thermo-magnetic cycle apparatus in claim 2, wherein
    the heat exchange portion has a vibrator which provides different vibrating state on the magneto-caloric element in each of flow directions of the bidirectional flow.

9. The thermo-magnetic cycle apparatus in claim 1, wherein
    the heat transporting device provides the same flow amounts in each of flow directions of the bidirectional flow.

10. The thermo-magnetic cycle apparatus in claim 1, wherein
    the magnetized period is shorter than $3/4$ of the demagnetized period.

11. The thermo-magnetic cycle apparatus in claim 1, wherein
    the magnetic field modulating device has a permanent magnet that has a size corresponding to the magnetized period.

12. The thermo-magnetic cycle apparatus in claim 11, wherein
    the permanent magnet is fixed on a radial outside of a rotary shaft to occupy a range extending in a circumferential direction, a circumferential occupying rate of the permanent magnet on a plan perpendicular to the rotary shaft is smaller than $1/2$.

* * * * *